(12) United States Patent
Das et al.

(10) Patent No.: US 8,702,862 B2
(45) Date of Patent: Apr. 22, 2014

(54) UNIVERSAL VOC-FREE METALLIC/PEARLESCENT COLORANTS

(75) Inventors: Rajesh Das, Totowa, NJ (US);
Mohammad Asif, Middletown, NJ (US);
Glen Cooper, East Hanover, NJ (US);
Robert Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 149 days.

(21) Appl. No.: 13/541,370

(22) Filed: Jul. 3, 2012

(65) Prior Publication Data
US 2014/0007794 A1 Jan. 9, 2014

(51) Int. Cl.
*C09D 17/00* (2006.01)
*C08L 1/00* (2006.01)
*C09D 101/00* (2006.01)
*C09D 7/12* (2006.01)
*C09D 101/02* (2006.01)
*C08K 3/34* (2006.01)
*C08L 1/02* (2006.01)

(52) U.S. Cl.
CPC ............. *C09D 17/00* (2013.01); *C09D 17/004* (2013.01); *C09D 7/12* (2013.01); *C09D 101/00* (2013.01); *C09D 101/02* (2013.01); *C08K 3/34* (2013.01); *C08L 1/00* (2013.01); *C08L 1/02* (2013.01)
USPC ................. 106/491; 106/203.2; 106/204.01; 106/204.3; 106/401; 106/481; 106/482; 106/483; 106/501.1

(58) Field of Classification Search
CPC ........... C08L 1/00; C08L 1/02; C09D 101/00; C09D 101/02; C09D 7/12; C09D 17/00; C09D 17/004; C08K 3/34
USPC .............. 106/203.2, 204.01, 204.3, 401, 481, 106/482, 483, 491, 501.1
See application file for complete search history.

(56) References Cited

U.S. PATENT DOCUMENTS

| | | | |
|---|---|---|---|
| 4,891,213 | A | 1/1990 | Gordon et al. |
| 5,025,041 | A | 6/1991 | Pfenninger et al. |
| 5,411,858 | A | 5/1995 | McGeehan et al. |
| 5,767,176 | A | 6/1998 | Nakanishi et al. |
| 5,897,698 | A | 4/1999 | Bellas |
| 5,934,513 | A | 8/1999 | Bellas |
| 7,262,240 | B1 | 8/2007 | Breton et al. |
| 7,659,340 | B2 | 2/2010 | Coward et al. |
| 7,815,924 | B2 | 10/2010 | Vonbehren et al. |
| 2003/0145762 | A1 | 8/2003 | Richardson et al. |
| 2004/0115142 | A1 | 6/2004 | Sherwood et al. |
| 2004/0156811 | A1 | 8/2004 | Lynch |
| 2006/0013928 | A1 | 1/2006 | Steet et al. |
| 2006/0160921 | A1 | 7/2006 | Ragone et al. |
| 2006/0251775 | A1 | 11/2006 | Anderson et al. |
| 2006/0280701 | A1 | 12/2006 | Lynch |
| 2011/0092641 | A1 | 4/2011 | Parris et al. |

FOREIGN PATENT DOCUMENTS

JP          05-132644 A  *  5/1993  ................ C09C 3/10

OTHER PUBLICATIONS

Ayling, Lynch, Yang, Colloidal Microcrystalline Cellulose, Jan. 1, 2008, Reached at http://www.pcimag.com/articles/colloidal-microcrystalline-cellulose.
Monicolor™ C, Reached at: http://www.cpscolor.com/cpscolor/cpsweb.nsf/sp?Open&cid=Content16FBC&screen=viewproduct&id=Product3DC684.
Coltec™ C, Reached at: http://www.cpscolor.com/cpscolor/cpsweb.nsf/sp?Open&cid=Content16FBC&screen=viewproduct&id=Product48D0B9.
Monicolor™ Universal The colorant standard for universal decorative applications Reached at: http://www.cpscolor.com/cpscolor/cpsproducts.nsf/d1/Download46EF47/$FILE/A4_Monicolor%20Universal.pdf?OpenElement.
Coltec™ Universal The benchmark colorant system for universal decorative applications Reached at: http://www.cpscolor.com/cpscolor/cpsproducts.nsf/d1/Download5101D0/$FILE/A4_Coltec%20Universal.pdf?OpenElement.
Laponite RD The Clear Leader Southern Clay Products.
Carbowax™ and Carbowax Sentry™ Polyethylene Glycol 400 The Dow Chemical Company Reached at http://www.polystar-china.com.cn/download/TDS/rj/PEG400TDS.pdf.
Material Safety Data Sheet Lattice® NTC 80 Microcrystalline Cellulose and Sodium Carboxymethylcellulose FMC Corporation Reached at: http://msds.fmc.com/msds/100000012998-MSDS_US-E.pdf.
Laponite RD Rookwood Additives Limited/Rookwood Clay Additives GMBH Laponite Product Bulletin L-RD-06i Reached at: http://www.rockwoodadditives.com/product_bulletins_eu/PB%20Laponite%20RD.pdf.
Strodex PK-0VOC Ashland Specialty Ingredients Published on Innovadex-The Search Engine for Product Innovators Reached by: http://www.innovadex.com/Coatings/Detail/306/16344?print=y.
"Tego® Dispers 650." Tego® Dispers 650 by Tego. SpecialChem Reached by: http://www.specialchem4coatings.com/tds/tego-dispers-650/tego/937/index.aspx.
"Disperbyko®-190." Wetting and Dispersing Additive, Aqueous Systems: Disperbykā®-190. Reached by: http://www.byk.com/en/additives/additives-by-name/disperbyk-190.php.
"Rhodoline® 999." Rhodoline® 999 by Rhodia, Part of Solvay. Reached by: http://www.specialchem4coatings.com/tds/rhodoline-999/rhodia/7534/index.aspx.
Solsperse™ 27000 Product Datasheet Lubrizol. Mar. 2004. Reached by: http://www.raiserchem.com.cn/editor/UpFiles/products_tds/solsperse_tds/solsperse_27000tds.pdf.
Colortrend 807, Product Database, EVONIK Industries.
Colortrend 802, Product Database, EVONIK Industries.
Colortrend 802S, Product Database, EVONIK Industries.
Information on Products, 20 Microns Limited, North Dakota State University, Polymers and Coatings Department,1993, pp. 1509-1527, Fargo, North Dakota.

(Continued)

*Primary Examiner* — Anthony J Green
(74) *Attorney, Agent, or Firm* — The H.T. Than Law Group

(57) ABSTRACT

The present invention relates to a universal metallic/pearlescent colorant composition that is free of VOCs including alkylphenol ethoxylate (APE) and formaldehyde. The colorant composition comprises substantially no resin and comprises microcrystalline cellulose and optionally a synthetic silicate to disperse the metallic pigments.

19 Claims, No Drawings

(56) References Cited

OTHER PUBLICATIONS

Colortrend 808 No-VOC Colorants FAQ's, Answers to Frequently Asked Questions, EVONIK Industries.

Ma, Lundberg, Glass, Phase Behaviors and Film Properties of Dispersions and Coatings Containing Associative and Conventional Thickeners.

* cited by examiner

UNIVERSAL VOC-FREE METALLIC/PEARLESCENT COLORANTS

FIELD OF THE INVENTION

This invention generally relates to universal zero-VOC metallic/pearlescent colorants and methods for preparing same.

BACKGROUND OF THE INVENTION

Paint comprises a film-forming continuous phase component that may be aqueous or non-aqueous, which contains a polymer as a solute or as a colloidal dispersion. This film-forming component is known as the binder and is the only component that is necessary to make a paint composition. Pigments are particulate compounds which can be dispersed in a medium, resin, or polymer binder to provide hiding power and to provide color to paints and coatings. Pigments may also improve the strength and adhesion of the paint film, improve the durability and weathering properties, provide opacity and special effects (e.g., flip, sparkle), and modify flow and application properties. Pigments can be divided into natural or synthetic, and organic or inorganic. Metallic/pearlescent pigments are used for decorative purposes to create luster effects in coatings. Pearlescent effects can be achieved by coating thin flakes with one or more layers of a metal oxide such as titanium dioxide or iron oxide. Light diffraction and interference occur in these layers produce a pearlescent effect. Metallic/pearlescent pigments are generally heavier than other pigments and are harder to disperse.

Pigments can be dispersed into paints in a dry powder form or in a colorant liquid composition. Colorants are not paints and comprise much less binders than paints. Colorants that can be used with either aqueous latex or solvent-based surface coatings are called universal colorants. Heavy pigment particles must be separated from one another and evenly distributed throughout colorant compositions as a colloidal suspension. Otherwise, a variety of defects can occur such as color shift, flooding and floating, settling and loss of gloss. Pigments that have no charges on them and are not coated need surfactants/dispersants for better distribution. Traditional formulations use volatile organic compounds (VOC) to control the effectiveness and suspension of pigments. For example, a wetting agent or surfactant, such as alkylphenol ethoxylate (APE), is used to improve the distribution of pigment particles. These wetting agents or surfactants are often volatile and generate odor.

Due to environmental concerns, among other things, there has been a movement toward reducing the amount of volatile organic compounds (VOC) in paints, stains, and other coating compositions. Various attempts have been carried out to produce low-VOC or zero-VOC colorants. U.S. Pat. No. 7,659,340 to Coward et al. discloses a low-VOC universal colorant composition including a colorant component, a surfactant package including at least one alkyd-compatible surfactant and at least one latex-compatible surfactant, and a carrier, wherein the surfactant package is substantially free of APE and wherein the colorant-to-binder ratio is from 0.5 to 14.3. US 2011/0092641 to Parris et al. discloses a method of preparing solventless universal colorants comprising milling a pigment in a resin that is soluble in both water and organic solvent, wherein the resin contains both hydrophobic and hydrophilic monomers.

There remains a need for developing a universal metallic/pearlescent colorant that contains no VOCs including APE and formaldehyde, and preferably no resin. Having a color palette with a metallic/pearlescent backbone that is tintable in both a pastel and deep color helps broaden the capability of color effects.

SUMMARY OF THE INVENTION

The present invention relates to colorant formulations comprising cellulose preferably microsized cellulose additives that swell up and entrap the dispersed pigments from separating with age, eliminating the use of any volatile chemicals for suspension. The universal VOC-free pearlescent colorant can be used with solvent-based or water-based binders and comprises at about 6% to about 12% by weight microcrystalline cellulose (MCC), preferably about 8% to about 10% by weight, wherein the colorant is not paint and contains low amount or substantially no resin, wherein the colorant contains no APE, no formaldehyde, no polymeric thickener, and no free silica, wherein the average pigment load is about 15%—about 40% by weight, preferably about 20%—about 30% by weight, and wherein pigment volume concentration (PVC) is more than about 80%. VOCs of the inventive colorant are below 300 ppm, and more preferably below 200 ppm.

Preferably, the inventive colorant formulation contains a synthetic silicate in addition to the MCC to help suspend the color pigments. Color pigments include metallic and pearlescent pigments.

DETAILED DESCRIPTION OF THE INVENTION

Unlike paints or other architecture coatings, colorants are additives to paints and generally do not form films that protect the substrates that they coat. Paints can be classified according to the gloss or finish of the dried films, i.e., high gloss, semi-gloss, satin, eggshell and flat. The gloss or finish of the paint can be defined by the PVC %, as follows:

| Type of Paint | PVC % |
| --- | --- |
| High Gloss | 15 |
| Semi-Gloss | 25 |
| Satin | 35 |
| Eggshell | 35-45 |
| Flat | 38-80 | where PVC % = [(Volume of Pigments)/(Volume of Pigments + Volume of Binder)] × 100

Hence, paint has a PVC % from 15% to 80%. It is well known that at PVC % of greater than about 80%, the coating compositions are no longer paints or in other words no longer form films that would protect the substrate they coat. The present invention is directed to colorants or colorant additives to paint compositions to provide the paints with various colors. Colorants can be effectively removed from a substrate with less than 10 scrubs. They have a PVC % of greater than about 80% and preferably greater than about 85%, more preferably greater than 90% and more preferably greater than about 95%. In some embodiments PVC % of the inventive colorant can be substantially 100% or has substantially no resin.

In accordance to another aspect of the present invention, the pigments in the inventive colorants contain mostly colored pigments or non-white pigments, such as $TiO_2$ or ZnO. White pigments are used in paint compositions to provide hiding power to cover the pre-existing colors or markings on the substrates to be painted. White pigments in the colorants can comprise less that about 15% of the total pigments, preferably less than about 10% and more preferably less than about 5%. The inventive colorants may have substantially no white pigment.

The inventive colorants preferably use swellable cellulose additives that swell up and entrap pigments and disperse pigments from coagulating with each other. Preferably, the cellulose additives are microsized and are known as microcrystalline cellulose or MCC with the formula of $C_{12}H_{22}O_{11}$. MCC is dispersible in water, dilute acid, common organic solvents and oil. Hence, MCC based colorants are suitable for use in aqueous and oil based paints.

Microcrystalline cellulose is produced by hydrolysis of purified wood pulp or disintegrating the crystalline regions of cellulose. Colloidal microcrystalline cellulose is dispersible in water and forms a 3-D network in water. The inventive colorant compositions comprise about 6 wt % to about 12 wt % microcrystalline cellulose, and more preferably between about 8% and 10% of MCC.

Metallic/pearlescent pigments in the preparation of the inventive colorant are thin flakes coated with one or more layers of metal oxides. The metal oxide layers are thin, preferably 100-150 nm, and may comprise more than one metal oxide. The thickness of the layers is varied to produce different interference colors. Examples of flaky substrates may include, but are not limited to, mica, synthetic mica, silica, aluminum oxide, sericite, synthetic sericite, boron nitride, barium sulfate, and titania-silica composite oxide. Mica is preferred due to its plate-like structure and its transparency, which adds to the pearlescent optical effects. The metal oxide coating may include, but are not limited to, titanium dioxide, iron oxide, chromium oxide, and oxides of copper, calcium, cadmium, cobalt, nickel, barium, strontium, manganese, magnesium, tin and lithium. The color of these pearlescent pigments is based on the type of coating layers, layer thickness, and number of layers. For example, iron oxide coated mica pigments may have reflective color ranging from yellow to red. Titanium oxide coated mica pigments may produce reflections of white, gold, red, blue, green, etc.

The colorant compositions preferably contain polyethylene glycol, silicate, low-VOC surfactants and dispersants, optionally but preferably a defoamer, optionally but preferably a rheology modifier, and optionally but preferably a biocide or preservative. Polyethylene glycol is a humectant that absorbs water and keeps the colorant composition wet.

Silicate is an extender pigment and suspension agent that gives body to the colorant composition. Silicate used for the inventive colorant is preferably an environment friendly synthetic aluminum silicate that contains no free silica. As shown in the Examples below, silicate can provide a synergistic effect when used with MCC to help disperse and suspend heavy pigments. The inventive colorant composition contains about 4 wt. % to about 9 wt. % of silicate.

Exemplary surfactants in the preparation of the colorant according to the invention include, but are not limited to, neutralized potassium salt of phosphate coester of aliphatic alcohols (Strodex PK-0VOC), dioctyl sodium sulfosuccinate (Aerosol OT, or other effective wetting/leveling agents), and tetrasodium N-(1,2-dicarboxyethyl)-N-octadecyl sulfosuccinamate (Aerosal 22), and Tristyrylphenol ethoxylate (POE 16) phosphate ester (or other similar arylphenol ethoxylate phosphate ester), etc.

Other suitable surfactants in the preparation of the inventive colorant may include, but are not limited to, nonionic and/or anionic surfactants such as anionic and/or nonionic emulsifiers such as alkali or ammonium alkyl sulfates, alkyl sulfonic acids, fatty acids, oxyethylated alkyl phenols, ammonium nonoxynol-4 sulfate, nonylphenol ethoxylate (10), octylphenol ethoxylate (9-10), sodium dodecylbenzene sulfonate, sodium dodecyl sulfonate, sodium tetradecyl sulfonate, sodium hexadecyl sulfonate, those sold under the tradename TRITON™ (e.g., QS series, CF series, X series, and the like), those sold under the tradename 1GEPAL™, those sold under the tradename RHODAPON™, those sold under the tradename RHODAPEX™, those sold under the tradename RHODAFAC™, those sold under the tradename RHODACAL™, and the like, and combinations thereof.

Examples of dispersants useful in the compositions according to the invention can include, but are not limited to, 2-amino-2-methyl-1-propanol, hydrophobic copolymers such as Tamol™ 165A, and combinations thereof Surfactants or dispersants may comprise up to about 30 wt. % of the colorant composition, preferably less than about 25 wt. %, and more preferably from about 15% to about 22% or from about 17% to about 20%.

Examples of defoamers useful in the compositions according to the invention can include, but are not limited to, polysiloxane-polyether copolymers such as those sold by Tego under the trade name Foamex™, those sold under the trade name BYK™, those sold under the trade name Drewplus™, those sold under the trade name Surfynol™, and the like, and combinations thereof.

Examples of rheology modifiers useful in the compositions according to the invention can include, but are not limited to, hydrophobically modified urethane rheology modifiers, hydrophobically modified polyether rheology modifiers, alkali swellable (or soluble) emulsions, hydrophobically modified alkali swellable (or soluble) emulsions, cellulosic or hydrophobically modified cellulosic rheology modifiers. Examples are those available from Rohm & Haas under the trade name Acrysol™, such as RM-8W, RM-825, RM-5000, RM-2020 NPR and RM-825, RM-5, TT-935, and Natrasol™, Natrasol Plus™and Aquaflow™ from Aqualon Division of Hercules Inc, and UCAR Polyphobe™ from Dow.

EXAMPLES

Example 1

Formula components in accordance with an aspect of the present invention are as follows:

| Description | Amount (lb) | Volume (gl) |
|---|---|---|
| Water | 391.808 | 47.036 |
| Polyethylene glycol (Carbowax PEG 400) | 36.735 | 3.912 |
| Sodium Hydroxide 50% (w/w) | 2.500 | 0.196 |
| MCC (Lattice NTC-80) | 9.141 | 1.828 |
| Silicate (Laponite RD) | 9.003 | 0.432 |
| Mix at low speed for 10 minutes then add very slowly. | | |
| Phosphate Ester Surfactant (Strodex PK-0 VOC*) | 54.887 | 6.160 |
| Polyether Dispersant (Tego Dispers 650) | 68.555 | 7.835 |
| Polyfunctional Polymer Dispersant with anionic and nonionic charters (Disperbyk-190) | 27.969 | 3.175 |
| Polyether Dispersant (Solsperse 27000) | 24.049 | 2.556 |
| Mix at low speed then add all pigments very slowly. | | |
| Pigment (Idiodin 307 Star Gold) | 169.719 | 7.278 |
| Pigment (Micron TALC 2050 SSW) | 70.000 | 3.110 |
| Defoamer (Rhodoline 999) | 4.306 | 0.522 |
| After the addition of the pigment, add defoamer and let the batch mix for 60 minutes then add the let down at low speed. | | |
| Water | 119.454 | 14.340 |
| Defoamer (Rhodoline 999) | 8.250 | 1.000 |

-continued

| Description | Amount (lb) | Volume (gl) |
|---|---|---|
| Sodium Hydroxide 50% (w/w) | 2.2000 | 0.173 |
| Preservative (Proxel BZ Plus**) | 4.570 | 0.448 |
| Add the defoamer under low speed and let the batch mix for 15 minutes. | | |

*The surfactant is a neutralized potassium salt of phosphate coester of aliphatic alcohols.
**A mixture of water, 1,2-benzisothiazolin-3-one, zinc pyrithione, zinc oxide, xanthan gam, and sodium polynaphthalene sulfonate.

In the above composition, no resin is used and the combination of surfactant(s) and dispersants was about 17.5%. The amount surfactants and dispersants in the colorant composition can be about 25% or less, preferably about 20% or less and preferably about 15% or less. The amount of silicate can be about the same as the MCC amount, as shown in the above example, preferably 75% or less of the MCC amount or preferably 50% or less the MCC amount. The amount of silicate can also be more than the amount of MCC, for example 125% or more, or 150% or more of the MCC amount. The amounts of MCC and silicate, alone or in combination, should be balanced or limited so as not to form gels or negatively affect the rheological properties of the colorant composition.

VOCs of the produced colorant were measured with gas chromatography/mass spectroscopy/120° C. headspace method and direct inject. Headspace analysis is a chromatographic tool also known as headspace gas chromatography/mass spectrometry (HGCMS). Headspace analysis can be used to identify and quantify components that emanate from a bulk solid or liquid at a given temperature. In other words headspace analysis detects volatile emissions from an aqueous solution in the bulk state at a specified temperature, as opposed to an environmental chamber test that measures volatile emissions as a coating composition dries to form a film. Methods of measuring VOCs are described in commonly owned published patent application US 2011/0098376, which is incorporated by reference in its entirety. Results are as follows:

| Inventive Sample | Non-Volatile (1 hr@110° C.) | Weight per Gallon (lb) | Exempt Volatiles | Volatiles | VOC (g/L minus water) |
|---|---|---|---|---|---|
| 1 | 49.93% | 10.498 | 50.04% water | 0.0279% | 1 |

The following compounds were quantified using Benjamin Moore's 120° C. headspace method and a compound specific calibration:

| VOC | Inventive Sample 1 |
|---|---|
| Acetone | 3 ppm |
| Methyl alcohol | 8 ppm |
| Dodecene | 3 ppm |
| 2-ethylhexanol | 5 ppm |

The following compounds were quantified using Benjamin Moore's 120° C. headspace method and a generic calibration (as toluene):

| VOC | Inventive Sample 1 |
|---|---|
| 1-hydroxy-2-propanone | 3 ppm |
| 2-(2-butoxyethoxy)-ethanol | 1 ppm |
| Isooctanol | 10 ppm |
| 1-nonanol | 10 ppm |
| 4-methyl-2-pentene | 14 ppm |
| Cyclohexane | 11 ppm |
| 1-octanol | 19 ppm |
| Acetophenone | 26 ppm |
| Unknowns (8) | 17 ppm |

Example 2

Other inventive colorants with similar formulations also demonstrate low or zero-VOC properties. Gas chromatography/mass spectroscopy/120° C. headspace method and direct inject results are as follows:

| Inventive Samples | Non-Volatile (1 hr@110° C.) | Weight per Gallon (lb) | Water (by difference) | Volatiles | VOC (g/L minus water) |
|---|---|---|---|---|---|
| 2 | 31.82% | 9.22 | 68.12% | 0.06% | 3 |
| 3 | 43.73% | 9.98 | 56.25% | 0.02% | 1 |
| 4 | 47.06% | 10.03 | 52.93% | 0.01% | 0 |

The following compounds were quantified using Benjamin Moore's 120° C. headspace method and a compound specific calibration:

| Samples | Inventive Sample 3 | Inventive Sample 4 |
|---|---|---|
| Acetone | 3 ppm | 3 ppm |
| Methyl alcohol | 3 ppm | 2 ppm |
| Dodecene | — | 4 ppm |
| 2-ethylhexanol | 6 ppm | — |

The following compounds were quantified using Benjamin Moore's 120° C. headspace method and a generic calibration (as toluene):

| Sample | Inventive Sample 3 | Inventive Sample 4 |
|---|---|---|
| 2,4,7,9-Tetramethyl-5-decyne-4,7-diol | 23 ppm | — |
| 1,2-Dimethyl-1-pentyl cyclopropane | — | 12 ppm |
| Hexanoic acid | 4 ppm | — |
| Tetrahydrofuran | — | 1 ppm |
| 3,7-Dimethyl undecane | 1 ppm | — |
| 3,8-Dimethyl undecane | — | 1 ppm |
| 2,2,4-Trimethyl-1-pentanol | 1 ppm | 1 ppm |
| 3,3-Diethyl pentane | 1 ppm | 1 ppm |
| 2-Ethyl-4-methyl-1-pentanol | 5 ppm | 5 ppm |
| 2-Propyl-1-pentanol | 2 ppm | — |
| Octanol | 29 ppm | 20 ppm |
| 2-Methyl-1-heptanol | 27 ppm | — |
| 3-Methyl-1-heptanol | — | 10 ppm |
| 4-Methyl-1-heptanol | — | 25 ppm |
| Acetophenone | 22 ppm | 22 ppm |
| Dodecene | 3 ppm | 3 ppm |
| 2-(Octyloxy)-ethanol | 5 ppm | — |
| Unknowns (number of compounds) | 10 ppm (4) | 16 ppm (6) |

The total VOCs quantified by headspace:

Inventive sample 2 is about 3 g/l minus water.

Inventive sample 3 is 145 ppm.

Inventive sample 4 is 126 ppm.

Comparative Example 3

A commercially-available colorant, Colortrend 835 Evonik Pearlescent Gold, is tested with gas chromatography/mass spectroscopy/120° C. headspace method and direct inject. Results are as follows:

| Sample | Non-Volatile (1 hr @ 110° C.) | Weight per Gallon (lb) | Exempt Volatiles | Volatiles | VOC (g/L minus water) |
|---|---|---|---|---|---|
| Colortrend 835 | 42.53% | 10.90 | None | 14.48% | 432 |

The following compounds were quantified using Benjamin Moore's 120° C. headspace method and a compound specific calibration:

| Methyl alcohol | 12 ppm |
|---|---|

The following compounds were quantified using Benjamin Moore's 120° C. headspace method and a generic calibration (as toluene):

| Methyl isobutyl ketone | 1 ppm |
|---|---|
| 2,2,4-trimethyl-1-pentanol | 3 ppm |
| 2-thyl-4-methyl-1-pentanol | 11 ppm |
| 6-methyl-1-heptanol | 87 ppm |
| 3-methyl-1-heptanol | 144 ppm |
| Octanol | 8 ppm |
| Unknowns (3) | 81 ppm |

The total VOCs quantified by headspace is 347 ppm.

The following compounds were quantified using Benjamin Moore's Direct Inject

Method and a compound specific calibration:

| Propylene glycol | 144,442 ppm |
|---|---|

Total amount of VOCs in the sample is 144,442+347=144,879 ppm and based on total sample weight is 14.48%, which is three orders of magnitude higher than the VOCs of the inventive samples.

Comparative Example 4

Another commercially-available colorant, Bi-Flair 83S Metallic—a non-universal low VOC colorant with resin, is tested with gas chromatography/mass spectroscopy/120° C. headspace method and direct inject. Results are as follows:

| Sample | Non-Volatile (1 hr @ 110° C.) | Weight per Gallon (lb) | Exempt Volatiles | Volatiles | VOC (g/L minus water) |
|---|---|---|---|---|---|
| Bi-Flair 83S | 55.55% | 14.99 to 16.66 | 44.42% water | 0.03% | 6* |

*Using manufacturer's published maximum weight per gallon.

The following compounds were quantified using Benjamin Moore's 120° C. headspace method and a compound specific calibration:

| Acetone | 10 ppm |
|---|---|
| Butyl alcohol | 42 ppm |
| Butyl acrylate | 19 ppm |
| Acetaldehyde | 6 ppm |
| Methyl alcohol | 5 ppm |
| Ethyl alcohol | 183 ppm |
| Dodecanol | 10 ppm |

The following compounds were quantified using Benjamin Moore's 120° C. headspace method and a generic calibration (as toluene):

| Pentanal | 1 ppm |
|---|---|
| Acetic acid | 18 ppm |
| Pentanoic acid | 3 ppm |
| Hexanoic acid | 7 ppm |
| Unknowns (3) | 12 ppm |

The total VOC quantified by headspace is 316 ppm and the reported VOC is 6 g/l minus water.

A direct injection was performed to determine if there are any high boiling compounds present that would affect the VOC calculation. None were detected.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A colorant composition usable with water-based latex paint and oil-based paint, wherein the percentage of pigment volume concentration (PVC %) of the colorant composition is greater than about 80%, said colorant composition comprising:
   a microcrystalline cellulose,
   a synthetic silicate,
   at least one metallic or pearlescent pigment, and
   at least one surfactant or dispersant.

2. The colorant composition of claim 1, wherein microcrystalline cellulose comprises at least about 6% by weight of the composition.

3. The colorant composition of claim 2, wherein the microcrystalline cellulose comprises below about 12% by weight of the composition.

4. The colorant composition of claim 1, wherein the microcrystalline cellulose comprises about 8% to about 10% by weight of the composition.

5. The colorant composition of claim 1, wherein a total of surfactant and/or dispersant comprises less than about 25% by weight of the composition.

6. The colorant composition of claim 5, wherein a total of surfactant and/or dispersant comprises less than about 20% by weight of the composition.

7. The colorant composition of claim 1, wherein the composition comprises substantially no free silica.

8. The colorant composition of claim 1, wherein the composition comprises substantially no polymeric thickener.

9. The colorant composition of claim 1, wherein the volatile organic compound (VOC) of the composition is below 300 ppm.

10. The colorant composition of claim 6, wherein the volatile organic compound (VOC) of the composition is below 200 ppm.

11. The colorant composition of claim 1 further comprising a polyethylene glycol.

12. The colorant composition of claim 1, wherein the average pigment load is about 15% to about 40% by weight.

13. The colorant composition of claim 12, wherein the average pigment load is about 20% to about 30% by weight.

14. The colorant composition of claim 1, wherein the PVC % of the composition is greater than about 85%.

15. The colorant composition of claim 14, wherein the PVC % of the composition is greater than about 90%.

16. The colorant composition of claim 15, wherein the PVC % of the composition is greater than about 95%.

17. The colorant composition of claim 1, wherein the PVC % of the composition is about 100% or the composition comprises substantially no resin.

18. The colorant composition of claim 1, wherein the synthetic silicate comprises about 75% by weight of the microcrystalline cellulose.

19. A paint composition comprising the colorant composition of claim 1.

\* \* \* \* \*